Aug. 14, 1928.

G. W. BOWER 1,680,724

CONNECTER FOR STRAIN INSULATORS

Filed Nov. 1, 1921

Inventor:
George W. Bower,
by Albert G. Davis
His Attorney.

Patented Aug. 14, 1928.

1,680,724

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

CONNECTER FOR STRAIN INSULATORS.

Application filed November 1, 1921. Serial No. 512,135.

The present invention relates to electric transmission and more especially to means for connecting together the strings of strain insulator units by which the circuit wires are suspended and insulated from the cross arms of towers or other supports.

The object of my invention is the provision of improved coupling means for connecting strain insulators together, which may be readily attached and detached, and which shall withstand the severe usage imposed thereon by the elements and the vibrations incident to its service.

Figure 1:
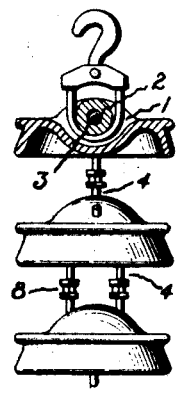
Figure 2:
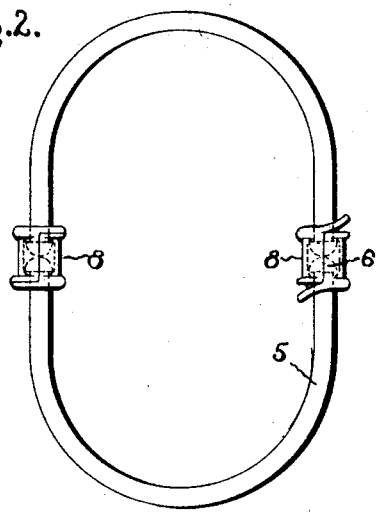
Figure 3:
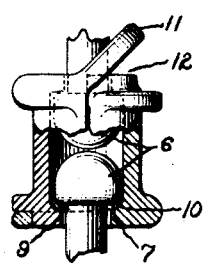
Figure 4:
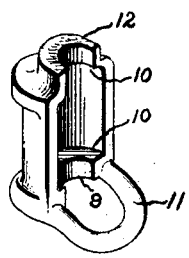
Figure 5:
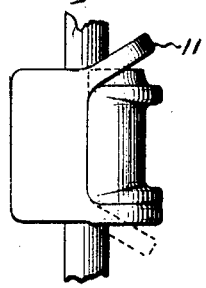

One embodiment of the invention is shown in the accompanying drawing in which Fig. 1 is an elevation of a string of three link insulators, with one shown in vertical section; Fig. 2 is a front elevation of a connecting device with one coupling in clinched position and the other unclinched; Fig. 3 is a part elevation and part section of a coupling; Fig. 4 is a perspective view of one member of a coupling, and Fig. 5 is a side elevation of a coupling comprising right and left members.

As shown in Fig. 1, the insulators have curved passageways 1 and 2 extending therein, each from an opposite side, and interlinked with each other on opposite sides of a wall 3 of insulation so that when stress is applied to the metallic connecters 4 disposed in the passageways, the insulating wall between them will be subjected to compressive stresses only.

The metallic connecters 4 are each composed of two U-shaped bows 5 of relatively thick bar metal having their ends upset to form rounded heads 6 and shoulders 7. These heads 6 are restricted in size on account of their being required to pass through the passageways 1 and 2 and the curvature of the intermediate portions is made to correspond with the curvature of the passageways so that the bearing between the parts may be distributed.

The oppositely disposed heads of two bows are secured together by split couplings 8 of malleable metal. Each member of the couplings is made semi-cylindrical with inturned flanges 9 having shoulders 10 for cooperating with shoulders 7 on the bows. In order that the coupling members may be easily fastened together, slender ring clips 11 are provided on one or both members and readily bent to embrace the other member by means of pliers or other suitable tools. As shown in Figs. 2, 3 and 4, the coupling members are counterparts and each is provided at one end with a retaining clip 11 in the form of a loop adapted to be bent down over a collar 12 at the opposite end of the companion member, whereas in the construction shown in Fig. 5 one member is provided with clip fingers 11 at both ends adapted to be bent into engagement with the ends of its companion member.

While I have shown and described the best embodiment of the invention known to me, I do not desire to be restricted thereto.

What I claim as new and desire to secure by Letters Patent of the United States, is:—

1. A connection for link insulators comprising two headed parts and a coupling consisting of two semicylindrical members, each of said members having internal shoulders for engaging said headed parts and having an attached flexible clip bendable over an end of the other member for securing said members in fixed relation to each other.

2. A connection for link insulators comprising two metallic parts provided with shouldered enlargements at their ends and a split coupling therefor, each coupling member being semicylindrical and having internal shoulders at its ends and ring clips permanently attached to said coupling members and adapted to embrace the companion member.

In witness whereof I have hereunto set my hand this 31st day of October, 1921.

GEORGE W. BOWER.